(12) United States Patent
Honsho

(10) Patent No.: US 10,168,544 B2
(45) Date of Patent: Jan. 1, 2019

(54) OPTICAL SYSTEM DRIVING DEVICE, LENS BARREL, AND OPTICAL DEVICE

(71) Applicant: Panasonic Intellectual Property Management Co., Ltd., Osaka (JP)

(72) Inventor: Hironori Honsho, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/496,351

(22) Filed: Apr. 25, 2017

(65) Prior Publication Data

US 2017/0227782 A1  Aug. 10, 2017

Related U.S. Application Data

(63) Continuation of application No. 15/058,205, filed on Mar. 2, 2016, now Pat. No. 9,664,982.

(30) Foreign Application Priority Data

Mar. 12, 2015  (JP) ................. 2015-050091
Dec. 3, 2015  (JP) ................. 2015-236229

(51) Int. Cl.
  *G02B 3/06* (2006.01)
  *G02B 7/02* (2006.01)
  *G02B 27/62* (2006.01)
  *G03B 5/00* (2006.01)
  *G02B 7/08* (2006.01)
  *G02B 27/64* (2006.01)
  (Continued)

(52) U.S. Cl.
  CPC .............. *G02B 27/62* (2013.01); *G01B 11/14* (2013.01); *G02B 7/023* (2013.01); *G02B 7/04* (2013.01); *G02B 7/08* (2013.01); *G02B 27/646* (2013.01); *G03B 5/00* (2013.01); *G03B 2205/0007* (2013.01); *G03B 2205/0053* (2013.01)

(58) Field of Classification Search
  CPC .. G02B 27/0966; G02B 19/0014; G02B 3/06; G02B 19/0052; G02B 27/0927
  USPC ....................................... 359/710
  See application file for complete search history.

(56) References Cited

U.S. PATENT DOCUMENTS

| 9,664,982 B2 * | 5/2017 | Honsho .................. G03B 5/00 |
| 2009/0009631 A1 * | 1/2009 | Hoshi .................. H04N 5/2178 |
|  |  | 348/231.99 |
| 2014/0211030 A1 * | 7/2014 | Hideshima .............. G03B 5/00 |
|  |  | 348/208.11 |

FOREIGN PATENT DOCUMENTS

| JP | 2009-002673 | 1/2009 |
| JP | 2013-076784 | 4/2013 |

* cited by examiner

*Primary Examiner* — Mohammed A Hasan
(74) *Attorney, Agent, or Firm* — Panasonic IP Management

(57) ABSTRACT

An optical system driving device includes a movable body that is movable in at least three degrees of freedom, and a light transmissive unit integrally mounted to the movable body. The optical system driving device also includes a driving unit that moves the movable body in at least three degrees of freedom, and a detection unit that detects a position of the movable body in each of at least three degrees of freedom. The detection unit includes a light-emitting unit that emits light toward the light transmissive unit, and an optical detector that receives light emitted from the light-emitting unit and passing through the light transmissive unit and outputs a light-receiving signal based on the received light. The detection unit also detects a position of the (Continued)

movable body in each of at least three degrees of freedom based on the light-receiving signal from the optical detector.

21 Claims, 14 Drawing Sheets

(51) Int. Cl.
*G01B 11/14* (2006.01)
*G02B 7/04* (2006.01)

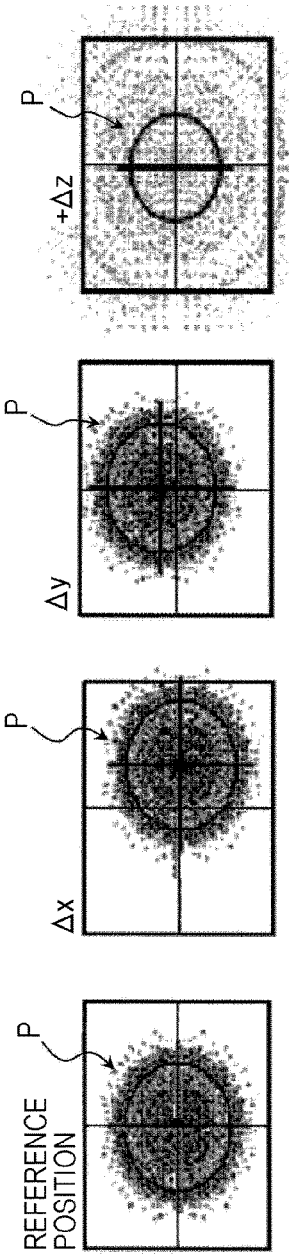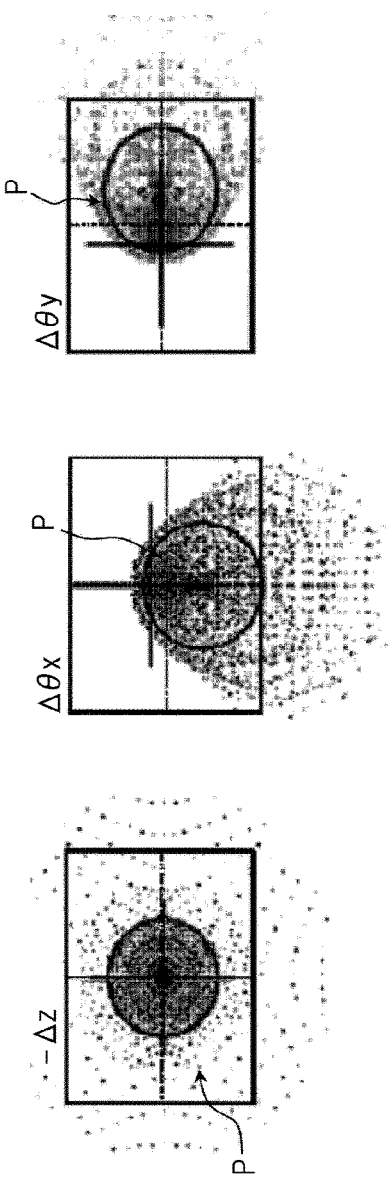

OPTICAL SYSTEM DRIVING DEVICE, LENS BARREL, AND OPTICAL DEVICE

BACKGROUND

1. Technical Field

The present disclosure relates to an optical system driving device for moving a movable body which is movable in at least three degrees of freedom, and a lens barrel and an optical device which include the optical system driving device.

2. Description of the Related Art

Patent Literature 1 discloses a technology in which alignment adjustment including optical axis aligning adjustment and cat's-eye adjustment is automatically performed by acquiring a fringe image with an imaging element mounted to an interferometer.

CITATION LIST

Patent Literature

PTL 1: Unexamined Japanese Patent Publication No. 2009-2673

SUMMARY

The present disclosure provides an optical system driving device, a lens barrel, and an optical device which enable detection of a position of a movable body, which is movable in at least three degrees of freedom, in each degree of freedom to enable high-precise position adjustment.

An optical system driving device according to the present disclosure includes a movable body that is movable in at least three degrees of freedom, and a light transmissive unit integrally mounted to the movable body and moving with the movable body. The optical system driving device also includes a driving unit that moves the movable body in each of at least three degrees of freedom, and a detection unit that detects a position of the movable body in each of at least three degrees of freedom. The detection unit includes a light-emitting unit that emits light toward the light transmissive unit, and an optical detector that receives light emitted from the light-emitting unit and passing through the light transmissive unit and outputs a light-receiving signal based on the received light. The detection unit also detects a position of the movable body in each of at least three degrees of freedom based on the light-receiving signal from the optical detector.

The optical system driving device according to the present disclosure is effective to detect a position of a movable body, which is movable in at least three degrees of freedom, in each degree of freedom to enable high-precise position adjustment.

BRIEF DESCRIPTION OF DRAWINGS

FIG. 21A is an explanatory view illustrating how a spot of light passing through a light transmissive unit is changed on a light-receiving surface of an optical detector, when a lens holder in the optical system driving device according to the fourth exemplary embodiment does not move from a reference position;

FIG. 21B is an explanatory view illustrating how a spot of light passing through a light transmissive unit is changed on a light-receiving surface of an optical detector, when a lens holder in the optical system driving device according to the fourth exemplary embodiment moves toward a positive side in an X axis direction;

FIG. 21C is an explanatory view illustrating how a spot of light passing through a light transmissive unit is changed on a light-receiving surface of an optical detector, when a lens holder in the optical system driving device according to the fourth exemplary embodiment moves toward a positive side in a Y axis direction;

FIG. 21D is an explanatory view illustrating how a spot of light passing through a light transmissive unit is changed on a light-receiving surface of an optical detector, when a lens holder in the optical system driving device according to the fourth exemplary embodiment moves toward a positive side in a Z axis direction;

FIG. 21E is an explanatory view illustrating how a spot of light passing through a light transmissive unit is changed on a light-receiving surface of an optical detector, when a lens holder in the optical system driving device according to the fourth exemplary embodiment moves toward a negative side in the Z axis direction;

FIG. 21F is an explanatory view illustrating how a spot of light passing through a light transmissive unit is changed on a light-receiving surface of an optical detector, when a lens holder in the optical system driving device according to the fourth exemplary embodiment rotates about an X axis; and FIG. 21G is an explanatory view illustrating how a spot of light passing through a light transmissive unit is changed on a light-receiving surface of an optical detector, when a lens holder in the optical system driving device according to the fourth exemplary embodiment rotates about a Y axis.

DETAILED DESCRIPTION

Hereinafter, exemplary embodiments will be described in detail with reference to the accompanying drawings as necessary. It is noted, however, that descriptions in more detail than necessary will sometimes be omitted. For example, detailed descriptions of well-known items and duplicate descriptions of substantially the same configuration will sometimes be omitted. This is to avoid unnecessary redundancy in the following description and to facilitate understanding by those skilled in the art.

Note that the accompanying drawings and the following descriptions are provided so as to facilitate fully understanding of the present disclosure by those skilled in the art, and these are not intended to limit the subject matter defined by the claims.

First Exemplary Embodiment

A first exemplary embodiment will be described below with reference to FIGS. 1 to 13.

[1-1. Configuration]

[1-1-1. Optical Device]

Figure 1:
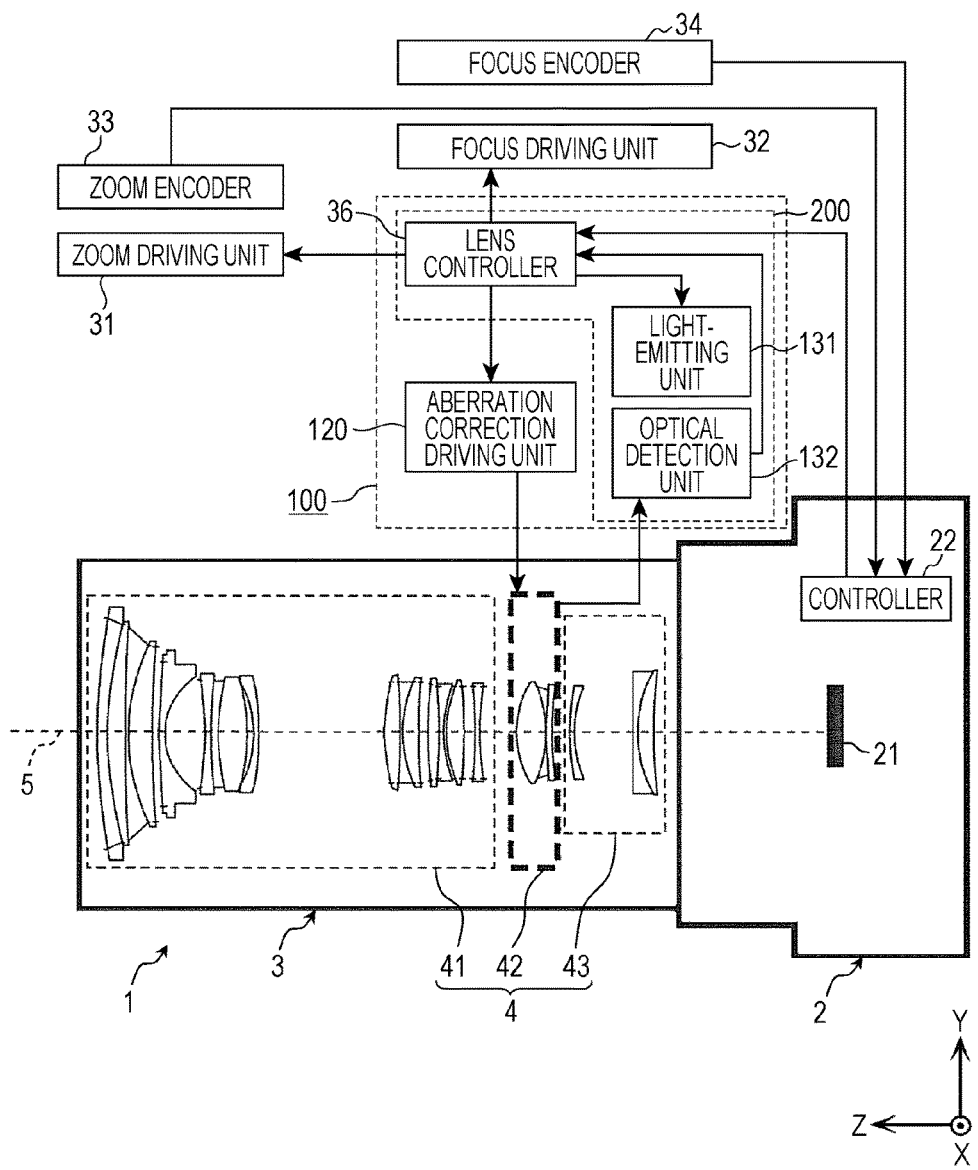
FIG. 1 is an explanatory diagram schematically illustrating a schematic configuration of a digital camera shown as an example of an optical device according to the first exemplary embodiment.

FIG. 1 is an explanatory diagram schematically illustrating a schematic configuration of a digital camera shown as one example of an optical device according to the first exemplary embodiment. As illustrated in FIG. 1, digital camera 1 includes camera body 2 and lens barrel 3.

In the present exemplary embodiment, a three-dimensional orthogonal coordinate system is set as illustrated in FIG. 1. A Z axis direction matches optical axis 5 of later-described optical system 4. A positive side in the Z axis direction means a subject side in the optical axis direction, and the opposite side is specified as a negative side. An X axis direction matches a width direction of digital camera 1 in a plane orthogonal to optical axis 5. A Y axis direction matches a height direction of digital camera 1 in a plane orthogonal to optical axis 5.

Lens barrel 3 includes optical system 4, zoom driving unit 31, focus driving unit 32, zoom encoder 33, focus encoder 34, and optical system driving device 100.

Optical system 4 includes first lens group 41, second lens group 42, and third lens group 43.

First lens group 41 moves along optical axis 5 so as to vary a zoom magnification. Second lens group 42 corrects aberration of optical system 4 through a control of an attitude of second lens group 42 relative to optical axis 5. Third lens group 43 adjusts a focus state of a subject image along optical axis 5.

Zoom driving unit 31 is, for example, a stepping motor that moves first lens group 41 along optical axis 5.

Focus driving unit 32 is, for example, a stepping motor that moves third lens group 43 along optical axis 5.

Zoom encoder 33 detects a zoom position (variable magnification position) of first lens group 41, and outputs the detected position to controller 22 (described later) of camera body 2.

Focus encoder 34 detects a focus position of third lens group 43, and outputs the resultant to controller 22 of camera body 2.

Optical system driving device 100 controls an attitude of second lens group 42 relative to optical axis 5. Optical system driving device 100 includes support mechanism 110 (see FIG. 2), aberration correction driving unit 120, light-emitting units 131, optical detectors 132, and lens controller 36.

Aberration correction driving unit 120 moves second lens group 42 relative to optical axis 5.

Light-emitting unit 131 and optical detector 132 detect a position of second lens group 42.

Lens controller 36 is a control device controlling a core of lens barrel 3. Lens controller 36 is connected to units mounted to lens barrel 3, and performs various sequence controls of lens barrel 3. Lens controller 36 includes a CPU (Central Processing Unit) including a control circuit, a ROM (Read Only Memory), a RAM (Random Access Memory), and the like. Lens controller 36 can implement various functions when a program stored in the ROM is read into the CPU.

Support mechanism 110 supports second lens group 42 so as to be movable.

The detail of optical system driving device 100 will be described later.

Camera body 2 includes imaging element 21 and controller 22.

Imaging element 21 is, for example, a CCD (Charge Coupled Device) which converts an optical image formed with optical system 4 of lens barrel 3 into an electrical signal. Imaging element 21 is driven with a timing signal. Notably, imaging element 21 may be a CMOS (Complementary Metal Oxide Semiconductor) sensor.

Controller 22 is a control device controlling a core of camera body 2. Controller 22 controls units of digital camera 1 based on operation signals from operation units such as a shutter button or a zoom lever. Specifically, controller 22 includes a CPU, a ROM, a RAM, and the like. Controller 22 can implement various functions when a program stored in the ROM is read into the CPU. For example, when a zoom position is input from zoom encoder 33, and a focus position is input from focus encoder 34, controller 22 calculates a position correction value of second lens group 42 based on the zoom position and the focus position, and outputs the position correction value to lens controller 36. Lens controller 36 controls aberration correction driving unit 120 based on the position correction value and a light-receiving signal output from optical detector 132, thereby controlling an attitude of second lens group 42.

[1-1-2. Optical System Driving Device]

Next, optical system driving device 100 will be described.

Figure 2:
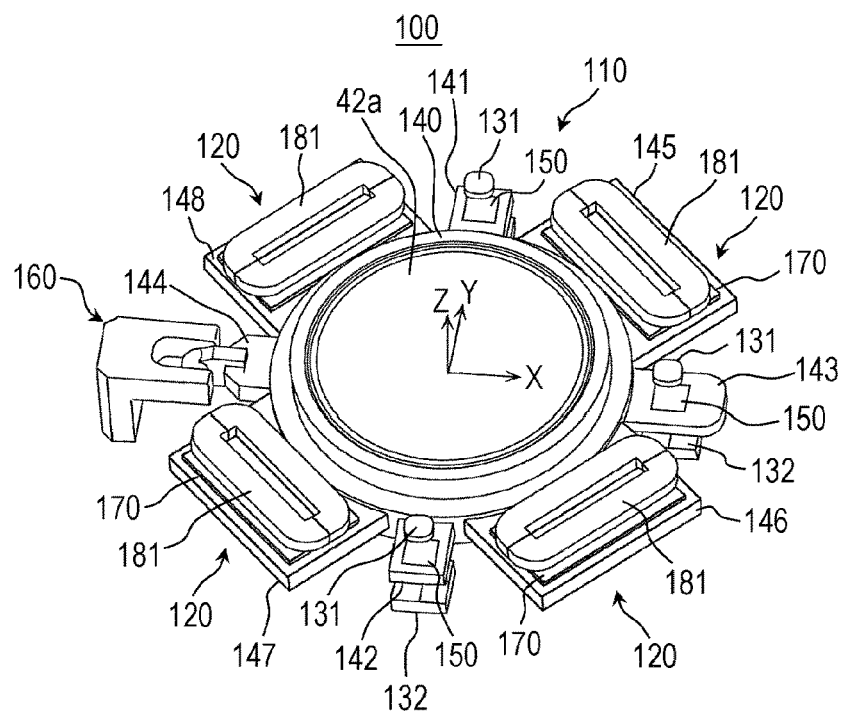
FIG. 2 is a perspective view illustrating an optical system driving device according to the first exemplary embodiment.
Figure 3:
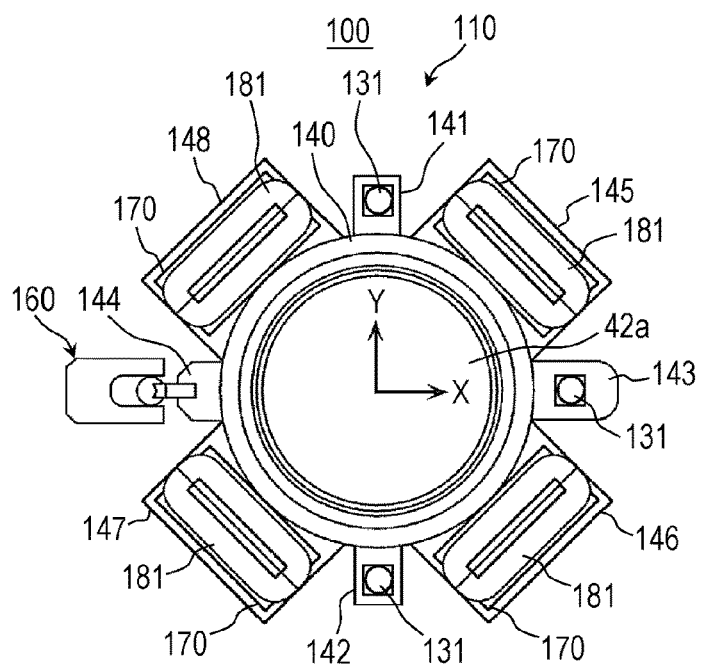
FIG. 3 is a front view illustrating the optical system driving device according to the first exemplary embodiment.
Figure 4:
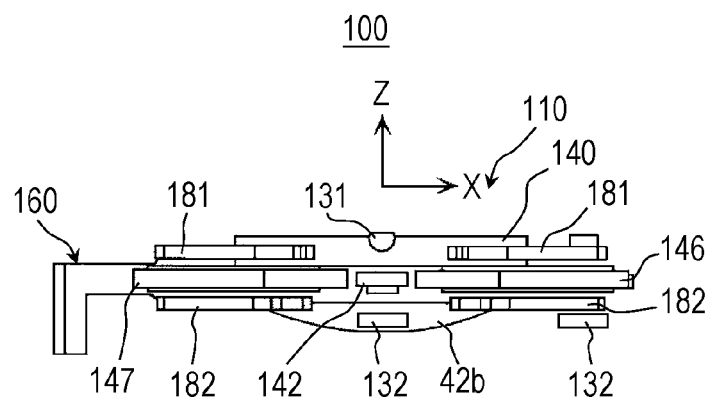
FIG. 4 is a side view illustrating the optical system driving device according to the first exemplary embodiment.
Figure 5:
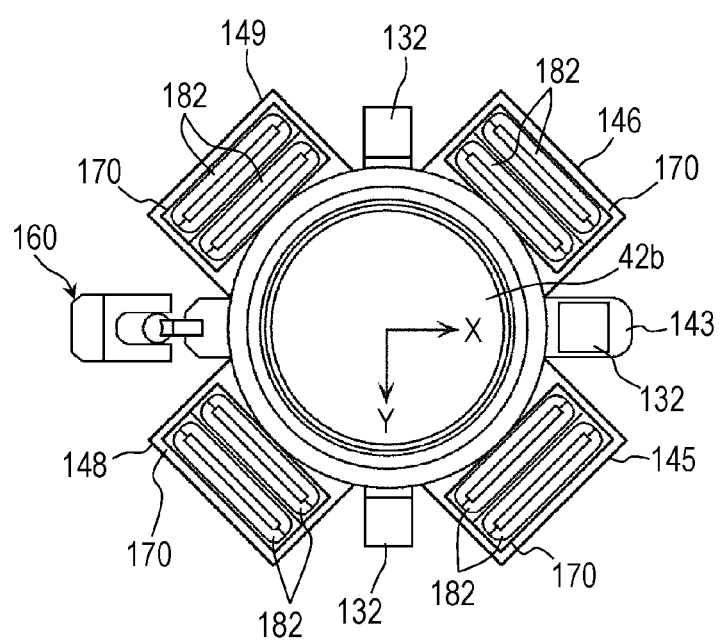
FIG. 5 is a back view illustrating the optical system driving device according to the first exemplary embodiment.

FIG. 2 is a perspective view illustrating optical system driving device 100 according to the first exemplary embodiment. FIG. 3 is a front view illustrating optical system driving device 100 according to the first exemplary embodiment. FIG. 4 is a side view illustrating optical system driving device 100 according to the first exemplary embodiment. FIG. 5 is a back view illustrating optical system driving device 100 according to the first exemplary embodiment.

As illustrated in FIGS. 2 to 5, optical system driving device 100 includes support mechanism 110, aberration correction driving unit 120, light-emitting units 131, and optical detectors 132.

Support mechanism 110 includes lens holder 140, light transmissive units 150, and restriction unit 160.

Lent holder 140 is one example of a movable body which is movable in at least three degrees of freedom. A degree of freedom means a degree in which one system can be displaced. In the three-dimensional orthogonal coordinate system, a total number of directions in which a system can be moved out of six moving directions is indicated as a degree of freedom, the six moving directions being an X-axis direction, a Y-axis direction, a Z-axis direction, a rotating direction about the X axis, a rotating direction about the Y axis, and a rotation direction about the Z axis. For example, the case in which a system can be moved in only one moving direction is indicated as "one degree of freedom", and the case in which a system can be moved in two directions is indicated as two degrees of freedom.

Lens holder 140 includes two lenses 42a, 42b in second lens group 42. The present exemplary embodiment describes that lens holder 140 holds two lenses 42a, 42b. However, lens holder 140 may hold only one lens, or three or more lenses.

Lens holder 140 encloses two lenses 42a, 42b, which are coaxially disposed, to hold these lenses. Lens holder 140 is provided with first piece part 141 and second piece part 142 at both ends in the Y axis direction, first piece part 141 and second piece part 142 projecting outward along the Y axis direction. Lens holder 140 is also provided with third piece part 143 and fourth piece part 144 at both ends in the X axis direction, third piece part 143 and fourth piece part 144 projecting outward along the X axis direction. Each of first piece part 141, second piece part 142, and third piece part 143 is provided with light transmissive unit 150.

Each of frames 145, 146, 147, 148 having generally rectangular shape in a plan view is provided between each of piece parts 141, 142, 143, 144 around lens holder 140. Each of frames 145, 146, 147, 148 holds magnet unit 170. First coil 181 for moving lens holder 140 in the X axis direction and Y axis direction is mounted to each magnet unit 170 at the positive side in the Z axis direction. A pair of second coils 182 for moving lens holder 140 in the Z axis direction is mounted to each magnet unit 170 at the negative side in the Z axis direction.

Figure 6:
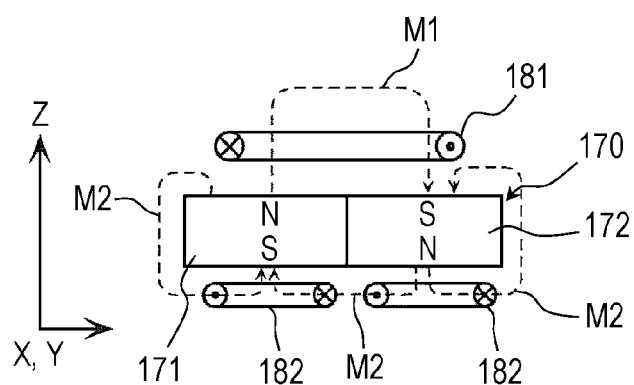
FIG. 6 is a side view illustrating a schematic configuration of a magnet unit, a first coil, and second coils in the optical system driving device according to the first exemplary embodiment.

FIG. 6 is a side view illustrating a schematic configuration of magnet unit 170, first coil 181, and second coils 182 in optical system driving device 100 according to the first exemplary embodiment.

As illustrated in FIG. 6, magnet unit 170 includes two plate magnets 171, 172 which have a rectangular shape in a plan view and are equal in size. A pair of main surfaces of plate magnets 171, 172 is exposed from frames 145, 146, 147, 148, the main surfaces being opposite to each other in the Z axis direction. Each of the pair of main surfaces is parallel to planes of lenses 42a, 42b orthogonal to the optical axis. Plate magnets 171, 172 are magnetized such that different magnet poles are formed in the thickness direction. Plate magnets 171, 172 are disposed to be adjacent to each other with different magnet poles directing upward (to the positive side in the Z axis direction). In the present exemplary embodiment, magnet unit 170 includes two plate magnets 171, 172. However, a magnet unit including one magnetized plate magnet may be used.

First coil 181 is disposed so as to face the main surfaces of the plate magnets 171, 172 at the positive side in the Z axis direction. First coil 181 is wound into substantially an ellipse as a whole, and the longer axis direction of the ellipse extends along the longitudinal direction of plate magnets 171, 172. First coil 181 is disposed to span two plate magnets 171, 172. A pair of opposing longitudinal parts of first coil 181 is disposed to face the substantially central part of each of plate magnets 171, 172 in the width direction. With this, magnetic field M1 perpendicular to the main surfaces of plate magnets 171, 172 at the positive side in the Z axis direction interlinks the longitudinal parts of first coil 181. Electric current generated with a power supply to first coil 181 interlinks magnetic field M1, so that thrust force (thrust force in the direction parallel to X-Y plane) in X-Y plane is generated. Specifically, with the control of electric current to first coil 181 in magnet unit 170, magnet unit 170 can be moved in X-Y plane (in the direction parallel to X-Y plane).

On the other hand, a pair of second coils 182 is disposed so as to face the main surfaces of plate magnets 171, 172 at the negative side in the Z axis direction. Each of second coils 182 is wound into substantially an ellipse as a whole, and the longer axis direction of the ellipse extends along the longitudinal direction of plate magnets 171, 172. Each of a pair of second coils 182 is disposed to face each of two plate magnets 171, 172. Longitudinal parts of a pair of second coils 182 are disposed to face both ends of plate magnets 171, 172 in the width direction. With this, magnetic field M2 parallel to the main surfaces of plate magnets 171, 172 at the negative side in the Z axis direction interlinks the longitudinal parts of second coil 182. Electric current generated with a power supply to second coils 182 interlinks magnetic field M2, so that thrust force in the Z axis direction is generated.

Specifically, with the control of electric current to a pair of second coils 182 in magnet unit 170, magnet unit 170 can be moved in the Z axis direction.

When electric currents to first coil 181 and a pair of second coils 182 in all magnet units 170 are comprehensively controlled, the attitude of lens holder 140 with respect to the Z axis direction can be controlled. Specifically, lens holder 140 can be moved with six degrees of freedom, that is, in the X axis direction, the Y axis direction, the Z axis direction, the rotating direction about the X axis, the rotating direction about the Y axis, and the rotating direction about the Z axis.

Magnet unit 170, first coil 181, and second coils 182 form aberration correction driving unit 120.

Figure 7:
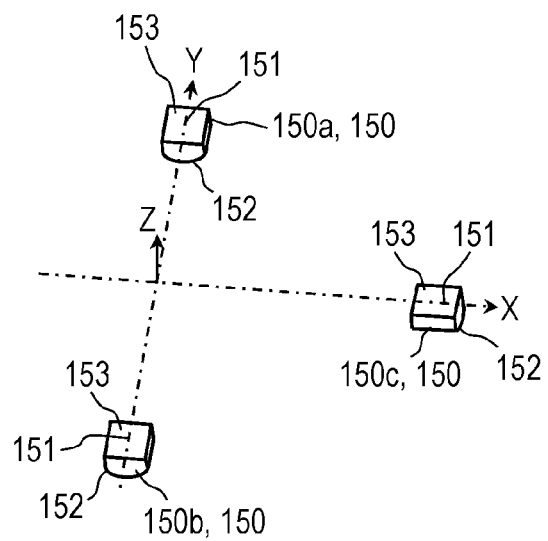
FIG. 7 is a perspective view illustrating a light transmissive unit provided to each piece part of the optical system driving device according to the first exemplary embodiment.

FIG. 7 is a perspective view illustrating light transmissive unit 150 provided to each piece part of optical system driving device 100 according to the first exemplary embodiment. FIG. 7 illustrates light transmissive unit 150 alone. Light transmissive unit 150 is a condenser condensing light. For example, it is a cylindrical lens. In the present exemplary embodiment, a convex cylindrical lens is used as one example. However, a concave cylindrical lens may be used, so long as it condenses light. Light transmissive unit (first light transmissive unit 150*a*) provided to first piece part 141 has axis 151 along the Y axis direction and convex surface 152 facing the negative side in the Z axis direction. Flat surface 153 of first light transmissive unit 150*a* opposite to convex surface 152 is parallel to the planes of lenses 42*a*, 42*b* orthogonal to the optical axis. The same configuration as described above is applied to light transmissive unit (second light transmissive unit 150*b*) provided to second piece part 142.

Light transmissive unit (third light transmissive unit 150*c*) provided to third piece part 143 has axis 151 along the X axis direction and convex surface 152 facing the negative side in the Z axis direction. Flat surface 153 of third light transmissive unit 150*c* opposite to convex surface 152 is parallel to the planes of lenses 42*a*, 42*b* orthogonal to the optical axis.

As illustrated in FIGS. 2 to 5, fourth piece part 144 projects from the peripheral edge of lens holder 140 in the X axis direction. Fourth piece part 144 is engaged with restriction unit 160 fixed to lens barrel 3.

Figure 8:
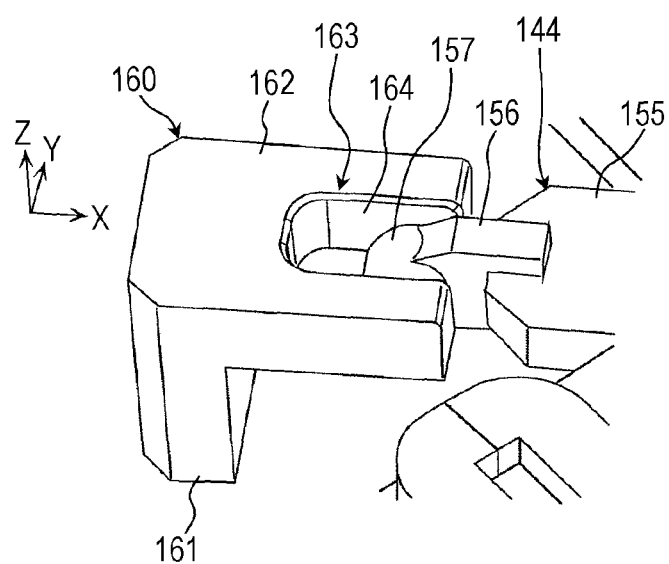
FIG. 8 is a perspective view illustrating a fourth piece part of the optical system driving device and a restriction unit according to the first exemplary embodiment.
Figure 9:
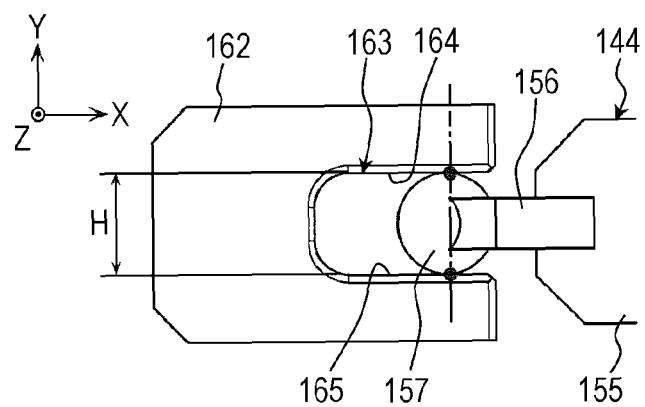
FIG. 9 is a front view illustrating a fourth piece part of the optical system driving device and a restriction unit according to the first exemplary embodiment.

FIG. 8 is a perspective view illustrating fourth piece part 144 of optical system driving device 100 and restriction unit 160 according to the first exemplary embodiment. FIG. 9 is a front view illustrating fourth piece part 144 of optical system driving device 100 and restriction unit 160 according to the first exemplary embodiment.

Fourth piece part 144 includes body 155, arm 156, and shaft 157.

Body 155 projects from the end of lens holder 140 along the X axis direction. Arm 156 extends outward from the tip of body 155. Arm 156 is formed such that the width in the Y axis direction is smaller than body 155. Shaft 157 is a protruding part mounted at the tip of arm 156 to have substantially a spherical shape. The diameter of shaft 157 is larger than the width of arm 156 in the Y axis direction. The center of arm 156 in the Y axis direction is overlapped with the center of shaft 157. With this, both ends of shaft 157 in the Y axis direction project from arm 156 with the same width.

Restriction unit 160 restricts one degree of freedom out of degrees of freedom in which lens holder 140 can be moved. Specifically, restriction unit 160 restricts the movement of lens holder 140 in the rotating direction about the Z axis. With this, lens holder 140 is movable in five degrees of freedom.

Restriction unit 160 is fixed at a position which is near lens holder 140 and opposite to fourth piece part 144. Restriction unit 160 includes base 161 and support part 162. Base 161 erects along the Z axis direction from a support member (not illustrated) in lens barrel 3. Support part 162 extends from the tip of base 161 toward lens holder 140 along the X axis direction. Support part 162 has a storage recess 163 for storing shaft 157. Storage recess 163 is recessed from the tip end face of support part 162 at the positive side in the X axis direction toward the negative side in the X axis direction, and is also open in the Z axis direction. A pair of planes 164, 165 defining storage recess 163 is parallel to each other, and is parallel to Z-X plane, planes 164, 165 being opposite to each other in the Y axis direction. In other words, width H of storage recess 163 in the Y axis direction is almost entirely uniform. A pair of planes 164, 165 holds shaft 157 in the Y axis direction with a point contact. A pair of opposing planes 164, 165 is separated from each other with width H in order to be in contact with shaft 157. Specifically, shaft 157 slides on a pair of planes 164, 165 with a spherical surface which forms an outer surface, so that shaft 157 can be translated in the X axis direction and Z axis direction within a pair of planes 164, 165. When a basis of the three-dimensional coordinate system is set on a center of shaft 157, shaft 157 can be moved in the rotating direction about the X axis, the rotating direction about the Y axis, and the rotating direction about the Z axis as being held by a pair of planes 164, 165, since the spherical surface serving as the outer surface of shaft 157 slides on a pair of planes 164, 165.

Specifically, when a basis of the three-dimensional coordinate system is set on a center of shaft 157, shaft 157 can be moved in five degrees of freedom, that is, in the X axis direction, the Z axis direction, the rotating direction about the X axis, the rotating direction about the Y axis, and the rotating direction about the Z axis.

The degree of freedom in which shaft 157 is movable has been described above. However, a degree of freedom is different, when it is considered from lenses 42*a*, 42*b* held by lens holder 140. The movement of shaft 157 in the Y axis direction is restricted by restriction unit 160. Therefore, when the basis of the three-dimensional coordinate system is set on the center of lens 42*a*, lens holder 140 is unable to rotate about the optical axis (Z axis). When lens holder 140 is rotated about the Z axis based on shaft 157 and shaft 157 is moved in the X axis direction, even if the movement of shaft 157 in the Y axis direction is restricted, lens holder 140 can be moved in the Y axis direction.

As described above, when the basis of the three-dimensional coordinate system is set on a center of lens 42*a*, lens holder 140 can be moved in five degrees of freedom, that is, in the X axis direction, the Y axis direction, the Z axis direction, the rotating direction about the X axis, and the rotating direction about the Y axis.

Although not illustrated, a regulation piece for preventing disengagement of shaft 157 from storage recess 163 is provided in lens barrel 3 for preventing shaft 157 from being disengaged from storage recess 163.

Shaft 157 is not necessarily sphere as a whole. Shaft 157 may have a spherical surface only within a range with which at least a pair of planes 164, 165 can be in contact.

Light-emitting unit 131 emits light toward light transmissive unit 150, and it is a laser diode emitting laser light, for example. As illustrated in FIGS. 2 to 4, three light-emitting units 131 are provided. Each of light-emitting units 131 is disposed so as to emit light toward light transmissive unit 150 at the positive side of light transmissive unit 150 in the Z axis direction. An LED (Light Emitting Diode) can be used as light-emitting unit 131.

Optical detector 132 receives light, which is emitted from light-emitting unit 131 and passes through light transmissive unit 150, and outputs a light-receiving signal based on the received light. Optical detector 132 is a quadrant photodetector, for example. It converts a quantity of light received in each separation region into a voltage, and outputs the voltage to the outside as a light-receiving signal. A light-receiving signal has a larger value, as an area receiving light is larger. Three optical detectors 132 are provided so as to make a pair with each of light-emitting units 131. Each of optical detectors 132 is disposed to face light-emitting unit 131 through light transmissive unit 150. A spot of light emitted from light-emitting unit 131 and passing through light transmissive unit 150 is formed on a light-receiving surface of each of optical detectors 132.

Light-emitting unit 131 and optical detector 132 are fixed to the support member (not illustrated) in lens barrel 3, and the relative positional relation of light-emitting unit 131 and optical detector 132 does not vary. On the other hand, positional relation between light transmissive unit 150 and both of light-emitting unit 131 and optical detector 132 varies.

Figure 10:
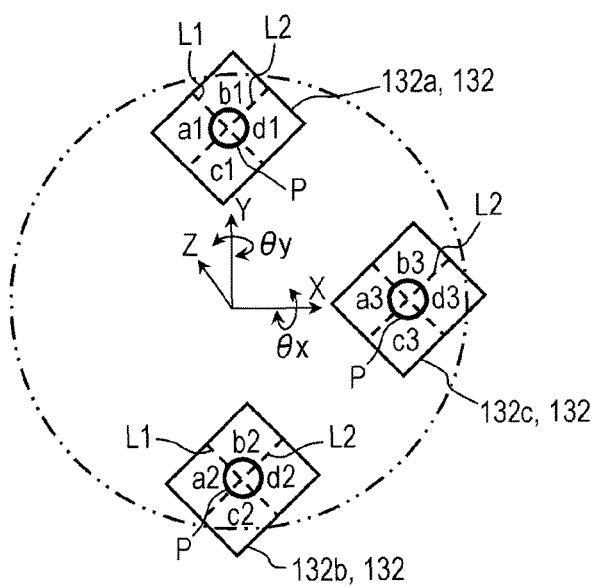
FIG. 10 is a front view schematically illustrating an arrangement example of optical detectors in the optical system driving device according to the first exemplary embodiment.

FIG. 10 is a front view schematically illustrating an arrangement example of optical detectors 132 in optical system driving device 100 according to the first exemplary embodiment.

Each of optical detectors 132 has separation boundaries L1 and L2. Separation boundaries L1 and L2 are set to bisect each other at the center of the light-receiving surface, thereby equally separating the light-receiving surface into four.

As illustrated in FIG. 10, optical detector 132 is disposed such that separation boundary L1 and separation boundary L2 are shifted at 45 degrees relative to the X axis and the Y axis respectively.

Figure 11A:
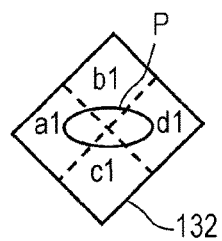
FIG. 11A is an explanatory view illustrating how a spot of light passing through a first light transmissive unit in the optical system driving device according to the first exemplary embodiment is changed on a light-receiving surface of an optical detector with the movement of the first light transmissive unit toward a negative side in a Z axis direction.
Figure 11B:
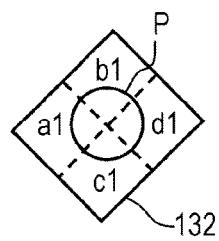
FIG. 11B is an explanatory view illustrating how a spot of light passing through a first light transmissive unit in the optical system driving device according to the first exemplary embodiment is changed on a light-receiving surface of an optical detector with the movement of the first light transmissive unit to a reference position in the Z axis direction.
Figure 11C:
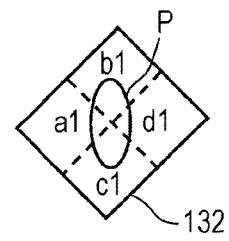
FIG. 11C is an explanatory view illustrating how a spot of light passing through a first light transmissive unit in the optical system driving device according to the first exemplary embodiment is changed on a light-receiving surface of an optical detector with the movement of the first light transmissive unit toward a positive side in the Z axis direction.

FIG. 11A is an explanatory view illustrating how a spot of light passing through first light transmissive unit 150a (see FIG. 7) in optical system driving device 100 according to the first exemplary embodiment is changed on the light-receiving surface of optical detector 132 with the movement of first light transmissive unit 150a in the Z axis direction. FIG. 11B is an explanatory view illustrating how a spot of light passing through first light transmissive unit 150a is changed on the light-receiving surface of optical detector 132 with the movement of first light transmissive unit 150a to a reference position in the Z axis direction. FIG. 11C is an explanatory view illustrating how a spot of light passing through first light transmissive unit 150a is changed on the light-receiving surface of optical detector 132 with the movement of first light transmissive unit 150a to the positive side in the Z axis direction.

As illustrated in FIG. 11B, when first light transmissive unit 150a is located on the reference position in the Z axis direction, light passing through first light transmissive unit 150a forms substantially circular spot P on the light-receiving surface. Since first light transmissive unit 150a is a cylindrical lens having axis 151 along the Y axis direction, a focal position in the X axis direction and a focal position in the Y axis direction are shifted from each other to cause astigmatism. Therefore, the shape of spot P varies depending on the distance of the optical axis (Z axis direction). Specifically, when first light transmissive unit 150a moves toward the negative side in the Z axis direction, that is, when first light transmissive unit 150a moves close to optical detector 132, the shape of spot P becomes an ellipse illustrated in FIG. 11A. On the other hand, when first light transmissive unit 150a moves toward the positive side in the Z axis direction, that is, when first light transmissive unit 150a moves away from optical detector 132, the shape of spot P becomes an ellipse illustrated in FIG. 11C. The longitudinal direction of the ellipse of spot P is shifted by 90 degrees depending on whether first light transmissive unit 150a moves toward the positive side or toward the negative side in the Z axis direction from the reference position.

Even if first light transmissive unit 150a illustrated in FIG. 7 moves in the Y axis direction or rotates about the X axis, the position and shape of spot P are not changed, since axis 151 of first light transmissive unit 150a extends along the Y axis direction. When first light transmissive unit 150a moves in the X axis direction or rotates about the Y axis, the position of spot P moves in the X axis direction. This is similarly applied to a spot formed with light passing through second light transmissive unit 150b and formed on the light-receiving surface of second optical detector 132b.

Even if third light transmissive unit 150c illustrated in FIG. 7 moves in the X axis direction or rotates about the Y axis, the position and shape of spot P are not changed, since axis 151 of third light transmissive unit 150c extends along the X axis direction. When third light transmissive unit 150c moves in the Y axis direction or rotates about the X axis, the position of spot P moves in the Y axis direction.

From these, relations represented by equations (1) to (6) described below are established.

Specifically, as illustrated in FIG. 10, a1, b1, c1, d1 are each a light-receiving signal (voltage value) of each of separation regions of first optical detector 132a facing first light transmissive unit 150a (see FIG. 7). a2, b2, c2, d2 are each a light-receiving signal (voltage value) of each of separation regions of second optical detector 132b facing second light transmissive unit 150b (see FIG. 7). a3, b3, c3, d3 are each a light-receiving signal (voltage value) of each of separation regions of third optical detector 132c facing third light transmissive unit 150c (see FIG. 7).

In the description below, x is a variable indicating X-coordinate at the centers of lenses 42a, 42b. y is a variable indicating Y-coordinate at the centers of lenses 42a, 42b. z is a variable indicating Z-coordinate at the centers of lenses 42a, 42b. θx is a variable indicating an angle about the X axis at the centers of lenses 42a, 42b. θy is a variable indicating an angle about the Y axis at the centers of lenses 42a, 42b. In addition, α1, α2, α3, β11, β12, β21, β22, γ1, γ2 are correction coefficients. Suitable values are obtained for correction coefficients from various experiments and simulations.

$$PD11 = a1 - d1 = \alpha 1 \times x + \beta 21 \times \theta y \tag{1}$$

$$PD12 = a1 + d1 - (b1 + c1) = \alpha 3 \times z + \beta 12 \times \theta x \tag{2}$$

$$PD21 = a2 - d2 = \alpha 1 \times x + \beta 21 \times \theta y \tag{3}$$

$$PD22 = a2 + d2 - (b2 + c2) = \alpha 3 \times z - \beta 12 \times \theta x \tag{4}$$

$$PD31 = c3 - b3 = \alpha 2 \times y + \beta 11 \times \theta x \tag{5}$$

$$PD32 = a3 + d3 - (b3 + c3) = \alpha 3 \times z + \beta 22 \times \theta y \tag{6}$$

The relations represented by equations (7) to (11) can be derived by solving these equations (1) to (6).

$$\theta x = \gamma 1 \times (PD12 - PD22) \tag{7}$$

$$\theta y = \gamma 2 \times (PD32 - (PD12 + PD22/2)) \qquad (8)$$

$$x = PD11 - \beta 2 \times \theta y = (PD11 - \beta 21 \times \gamma 2 \times (PD32 - (PD12 + PD22/2)))/\alpha 1 \qquad (9)$$

$$y = PD31 - \beta 1 \times \theta x = (PD31 - \beta 11 \times \gamma 1 \times (PD12 - PD22))/\alpha 2 \qquad (10)$$

$$z = (PD12 + PD22)/(2 \times \alpha 3) \qquad (11)$$

Lens controller 36 performs calculation based on a light-receiving signal output from each of optical detectors 132 and the above relation equations (1) to (11) to detect a position of lens holder 140 in each degree of freedom. Lens controller 36 is a calculation unit calculating a position in each degree of freedom. Detection unit 200 includes light-emitting units 131, optical detectors 132, and lens controller 36 (see FIG. 1).

[1-2. Operation]

An operation of digital camera 1 thus configured will be described below.

Figure 12:
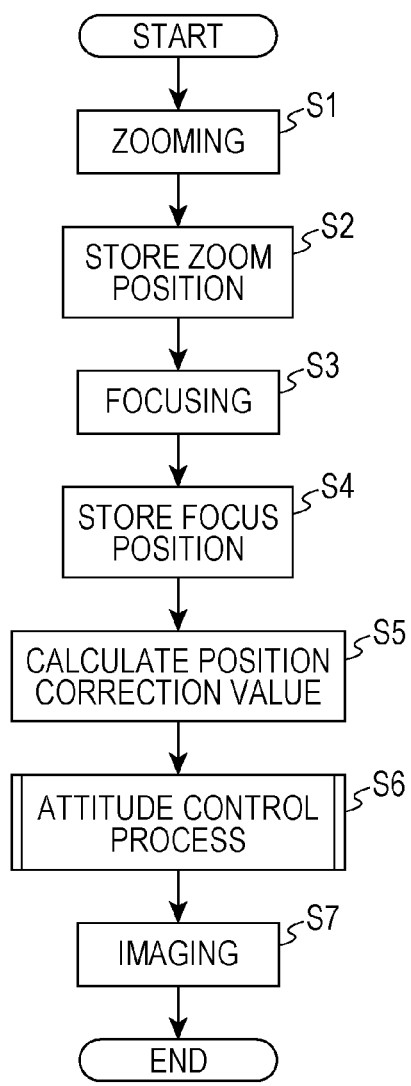
FIG. 12 is a flowchart illustrating a flow of a photographing process executed by a controller in a digital camera according to the first exemplary embodiment.

FIG. 12 is a flowchart illustrating a flow of a photographing process executed by controller 22 in digital camera 1 according to the first exemplary embodiment.

As illustrated in FIG. 12, when zooming operation is performed with the zoom lever, controller 22 controls zoom driving unit 31 through lens controller 36 to move first lens group 41 along an optical axis during the zooming operation (step S1). Controller 22 recognizes a zoom position of first lens group 41 based on an output result from zoom encoder 33 upon the end of the zooming operation, and stores this zoom position (step S2).

When an autofocus operation is performed with the shutter button, controller 22 then controls focus driving unit 32 through lens controller 36 to move third lens group 43 along the optical axis during the autofocus operation (step S3). Controller 22 recognizes a focus position of third lens group 43 based on an output result from focus encoder 34, and stores this focus position (step S4).

Controller 22 then calculates a position correction value of second lens group 42 from the zoom position of first lens group 41 and the focus position of third lens group 43 (step S5).

Controller 22 then outputs the position correction value of second lens group 42 to lens controller 36 to cause lens controller 36 to execute an attitude control process (step S6).

Figure 13:
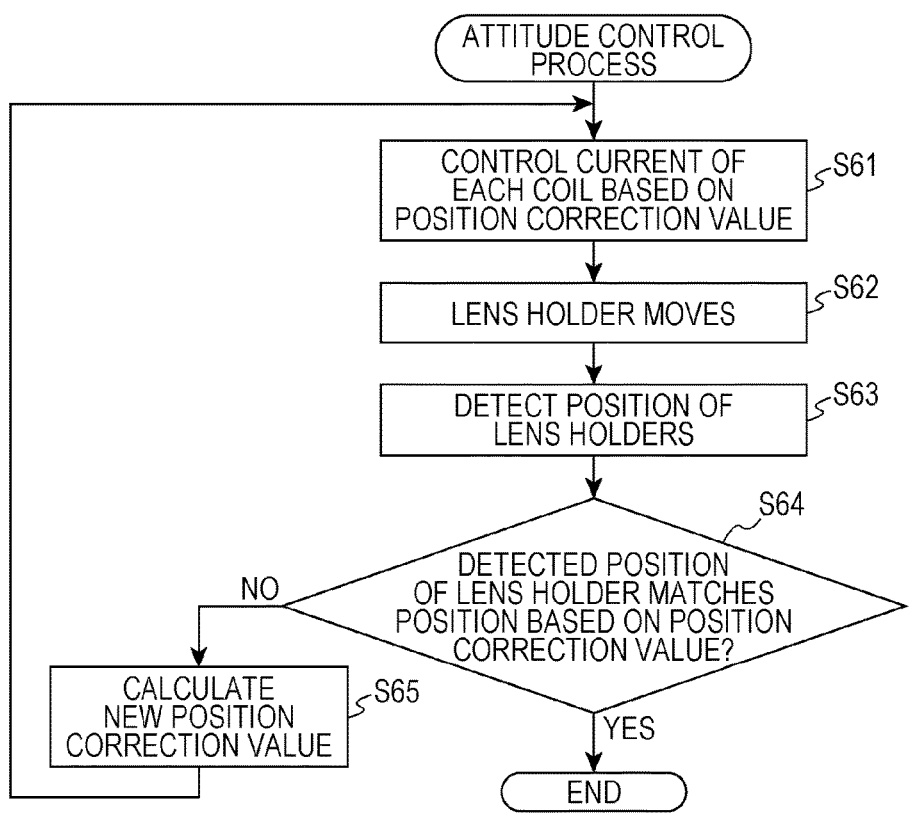
FIG. 13 is a flowchart illustrating a flow of an attitude control process executed by a lens controller in the optical system driving device according to the first exemplary embodiment.

FIG. 13 is a flowchart illustrating a flow of the attitude control process executed by lens controller 36 in optical system driving device 100 according to the first exemplary embodiment.

As illustrated in FIG. 13, lens controller 36 controls currents of first coils 181 and second coils 182 in all magnet units 170 based on the position correction value acquired from controller 22 (step S61). Specifically, lens controller 36 obtains correction values in each of five degrees of freedom from the position correction value, and determines current values for first coils 181 and second coils 182 in all magnet units 170 from the correction value of each degree of freedom.

With this, lens holder 140 moves in five degrees of freedom, that is, in the X axis direction, the Y axis direction, the Z axis direction, the rotating direction about the X axis, and the rotating direction about the Y axis (step S62).

Then, lens controller 36 detects a position of lens holder 140 in each degree of freedom (step S63). Specifically, lens controller 36 allows each light-emitting unit 131 to emit light toward each optical detector 132 through each light transmissive unit 150. With this, a light-receiving signal from each separation region is output to lens controller 36 from each optical detector 132. Lens controller 36 performs calculation based on the light-receiving signals and the above relation equations to detect a position of lens holder 140 in each degree of freedom.

Then, lens controller 36 determines whether or not the detected position of lens holder 140 in each degree of freedom matches the position in each degree of freedom based on the position correction value (S64).

When they are determined to match each other in step S64 (Yes in step S64), lens controller 36 ends the attitude control process, and proceeds to step S7 illustrated in FIG. 12.

When they are determined not to match each other in step S64 (No in step S64), lens controller 36 calculates a new position correction value from the detected position of lens holder 140 in each degree of freedom (step S65), and proceeds to step S61.

As illustrated in FIG. 12, in step S7, controller 22 executes imaging, when the shutter button is fully depressed.

[1-3. Effects]

As described above, according to the present exemplary embodiment, light transmissive units 150 are integrally provided to lens holder 140 that is a movable body movable in at least three degrees of freedom. Therefore, light transmissive units 150 move with lens holder 140. With this configuration, light transmissive units 150 move with the same degree of freedom as lens holder 140. When light transmissive units 150 move with lens holder 140, at least one of the shape, intensity, and distribution of spot P which is formed on optical detector 132 with light passing through light transmissive units 150 is changed in response to the movement of light transmissive units 150. Optical detectors 132 output light-receiving signals based on received light. Accordingly, with use of the light-receiving signals, the position of lens holder 140 in each degree of freedom can be obtained with high precision.

As a result, the position of the movable body, which is movable in at least three degrees of freedom, in each degree of freedom can be detected, whereby high-precise position control is enabled.

With the configuration in which light transmissive units 150 for detecting a position in each degree of freedom are integrally provided to lens holder 140, light transmissive units 150 can move with the same degree of freedom as lens holder 140. Accordingly, positions in at least three degrees of freedom can be detected with a simple configuration.

Since light transmissive units 150 are condensers, light passing through light transmissive units 150 can be condensed and emitted to optical detectors 132. The intensity of light is increased on optical detectors 132 with light condensing, so that light variation can reliably be detected.

The spot of light is decreased with light condensing, whereby compact optical detectors 132 can be used.

Since the condensers are cylindrical lenses, precise position detection using an astigmatic method is enabled.

In addition, three sets of light-emitting unit 131 and optical detector 132 are provided. Therefore, when light-receiving signals of three optical detectors 132 are used in combination, positions of lens holder 140 in four or more degrees of freedom (in the present exemplary embodiment, five degrees of freedom) can be detected.

As described above, optical system driving device 100 according to the present exemplary embodiment includes a movable body which is movable in at least three degrees of freedom and corresponds to lens holder 140, and light transmissive unit 150 which is integrally provided to the movable body and moves with the movable body. The optical system driving device also includes a driving unit which moves the movable body in each of at least three degrees of freedom and corresponds to aberration correction driving unit 120, and detection unit 200 which detects a position of the movable body in each of at least three degrees of freedom. Detection unit 200 includes light-emitting unit 131 that emits light toward light transmissive unit 150, and optical detector 132 that receives light emitted from light-emitting unit 131 and passing through light transmissive unit 150 and outputs a light-receiving signal based on the received light. Detector 200 also detects a position in each of at least three degrees of freedom based on the light-receiving signal of optical detector 132. With this configuration, the position of the movable body, which is movable in at least three degrees of freedom, in each degree of freedom can be detected, whereby high-precise position control is enabled.

Light transmissive unit 150 may be a condenser condensing light. With this configuration, optical detector 132 can reliably detect variation of light.

In addition, the condenser may be a cylindrical lens. With this configuration, precise position detection using an astigmatic method is enabled.

In addition, detection unit 200 may include three or more sets of light-emitting unit 131 and optical detector 132. With this configuration, positions of the movable of body in four or more degrees of freedom can be detected.

In addition, the movable body may be movable in at least five degrees of freedom. With this configuration, positions of the movable body in five degrees of freedom can be detected. Accordingly, the number of components can be reduced.

In addition, detection unit 200 may detect a position of the movable body in each of five degrees of freedom. With this configuration, the number of components can be reduced.

In addition, optical device 1 according to the present exemplary embodiment may include optical system driving device 100 and optical system 4 including a plurality of lenses. At least one of the plurality of lenses may be held with the movable body. With this, high-precise position control of the movable body is enabled.

In addition, optical device 1 according to the present exemplary embodiment may include optical system driving device 100 and an optical system including a plurality of lenses. At least one of the plurality of lenses may be held with the movable body, and light transmissive unit 150 may be the lens held with the movable body. With this, high-precise position control of the movable body is enabled.

Second Exemplary Embodiment

[2-1. Configuration]

A second exemplary embodiment will be described below with reference to FIGS. 14, 15A, and 15B. The configurations similar to the first exemplary embodiment are identified by the same reference numerals, and the description for similar configurations and operations may be omitted in some cases.

Figure 14:
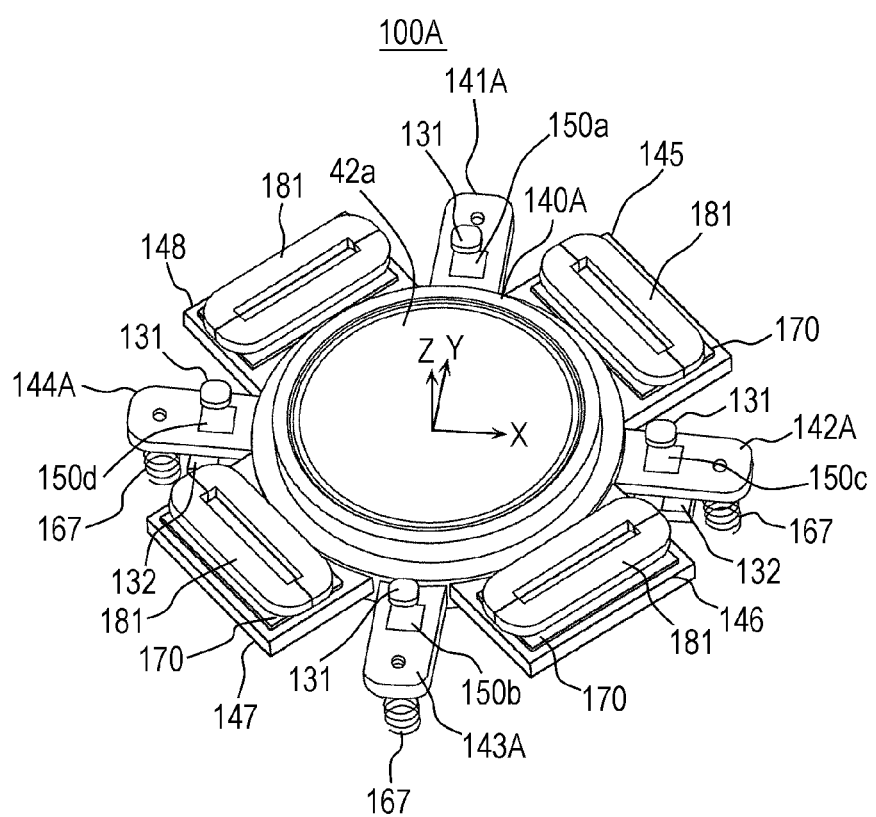
FIG. 14 is a perspective view illustrating an optical system driving device according to a second exemplary embodiment.
Figure 15A:
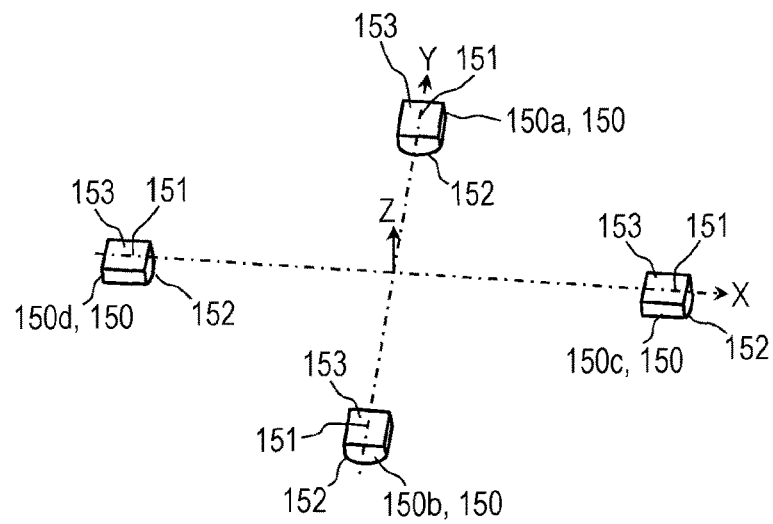
FIG. 15A is a perspective view illustrating a light transmissive unit provided to each piece part of the optical system driving device according to the second exemplary embodiment.

FIG. 14 is a perspective view illustrating optical system driving device 100A according to the present exemplary embodiment.

As illustrated in FIG. 14, light transmissive unit 150 (fourth light transmissive unit 150d) is mounted to fourth piece part 144A of lens holder 140A in optical system driving device 100A. As illustrated in FIG. 15A, fourth light transmissive unit 150d is a convex cylindrical lens. Axis 151 thereof extends along the X axis direction, and convex surface 152 faces the negative side in the Z axis direction.

Elastic member 167 such as a spring is mounted on a main surface of each of first piece part 141A, second piece part 142A, third piece part 143A, and fourth piece part 144A at the negative side in the Z axis direction. Each of elastic members 167 extends parallel to the Z axis direction. One end of each of elastic members 167 is mounted to the main surface of each of piece parts 141A, 142A, 143A, 144A at the negative side in the Z axis direction, and the other end is mounted to a support member (not illustrated) in lens barrel 3. Due to these elastic members 167, the movement of lens holder 140A in any degree of freedom is not restricted, and lens holder 140A is held so as to be swingable. Specifically, lens holder 140A can be moved in six degrees of freedom, that is, in the X axis direction, the Y axis direction, the Z axis direction, the rotating direction about the X axis, the rotating direction about the Y axis, and the rotating direction about the Z axis.

Light-emitting unit 131 and optical detector 132 are provided to be opposite to each other in the Z axis direction across fourth light transmissive unit 150d.

Figure 15B:
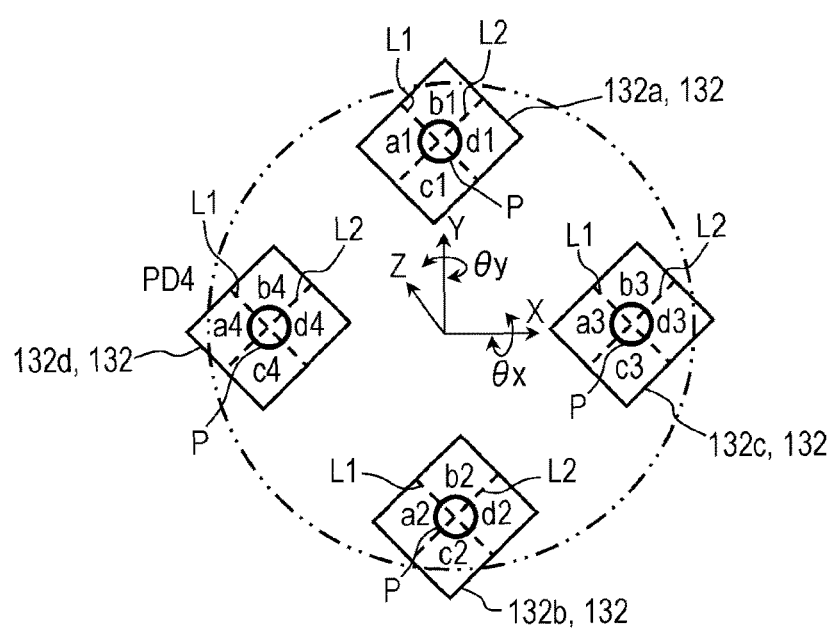
FIG. 15B is a front view schematically illustrating an arrangement example of optical detectors in the optical system driving device according to the second exemplary embodiment.

FIG. 15B is a front view schematically illustrating an arrangement example of optical detectors 132 in optical system driving device 100A according to the second exemplary embodiment.

As illustrated in FIG. 15B, optical detector 132 is disposed such that separation boundary L1 and separation boundary L2 are shifted at 45 degrees relative to the X axis and the Y axis respectively.

First light transmissive unit 150a, second light transmissive unit 150b, and third light transmissive unit 150c are arranged in the same manner as illustrated in FIG. 10.

Even if fourth light transmissive unit 150d moves in the X axis direction or rotates about the Y axis, the position and shape of spot P are not changed, since axis 151 of fourth light transmissive unit 150d extends along the X axis direction. When fourth light transmissive unit 150d moves in the Y axis direction or rotates about the X axis, the position of spot P moves in the Y axis direction.

From these, relations represented by equations (12) to (19) described below are established.

Specifically, as illustrated in FIG. 15B, a1, b1, c1, d1 are each a light-receiving signal (voltage value) of each of separation regions of first optical detector 132a facing first light transmissive unit 150a. a2, b2, c2, d2 are each a light-receiving signal of each of separation regions of second optical detector 132b facing second light transmissive unit 150b. a3, b3, c3, d3 are each a light-receiving signal of each of separation regions of third optical detector 132c facing third light transmissive unit 150c. a4, b4, c4, d4 are each a light-receiving signal of each of separation regions of fourth optical detector 132d facing fourth light transmissive unit 150d.

In the description below, x is a variable indicating X-coordinate at the centers of lenses 42a, 42b. y is a variable indicating Y-coordinate at the centers of lenses 42a, 42b. z is a variable indicating Z-coordinate at the centers of lenses 42a, 42b. $\theta x$ is a variable indicating an angle about the X axis at the centers of lenses 42a, 42b. $\theta y$ is a variable indicating an angle about the Y axis at the centers of lenses 42a, 42b. $\theta z$ is a variable indicating an angle about the Z axis at the centers of lenses 42a, 42b. In addition, $\alpha 1$, $\alpha 2$, $\alpha 3$, $\beta 11$, $\beta 12$, $\beta 21$, $\beta 22$, $\beta$ are correction coefficients. Suitable values are obtained for correction coefficients from various experiments and simulations.

$$PD11 = a1 - d1 = \alpha 1 \times x + \beta 21 \times \theta y + \beta 3 \times \theta z \quad (12)$$

$$PD12 = a1 + d1 - (b1 + c1) = \alpha 3 \times z + \beta 12 \times \theta x \quad (13)$$

$$PD21 = a2 - d2 = \alpha 1 \times x + \beta 21 \times \theta y - \beta 3 \times \theta z \quad (14)$$

$$PD22 = a2 + d2 - (b2 + c2) = \alpha 3 \times z - \beta 12 \times \theta x \quad (15)$$

$$PD31 = c3 - b3 = \alpha 2 \times y + \beta 11 \times \theta x + \beta 3 \times \theta z \quad (16)$$

$$PD32 = a3 + d3 - (b3 + c3) = \alpha 3 \times z + \beta 22 \times \theta y \quad (17)$$

$$PD41 = c4 - b4 = \alpha 2 \times y + \beta 12 \times \theta x - \beta 3 \times \theta z \quad (18)$$

$$PD42 = a4 + d4 - (b4 + c4) = \alpha 3 \times z - \beta 22 \times \theta y \quad (19)$$

The relations represented by equations (20) to (25) can be derived by solving these equations (12) to (19).

$$\theta x = (PD12 - PD22)/(2 \times \alpha 3) \quad (20)$$

$$\theta y = (PD32 - PD42)/(2 \times \alpha 3) \quad (21)$$

$$\theta z = (PD11 - PD21 + PD31 - PD41)/(4 \times \beta 3) \quad (22)$$

$$x = ((PD11 + PD21) - \beta 21 \times (PD32 - PD42)/\alpha 3)/(2 \times \alpha 3) \quad (23)$$

$$y = ((PD31 + PD41) - (PD11 - PD21 + PD31 - PD41)/2)/(2 \times \alpha 3) \quad (24)$$

$$z = (PD12 + PD22 + PD32 + PD42)/4 \quad (25)$$

Lens controller 36 performs calculation based on a light-receiving signal output from each of optical detectors 132 and the above relation equations (12) to (25) to detect a position of lens holder 140 in each degree of freedom. Lens controller 36 controls currents of first coils 181 and second coils 182 in all magnet units 170 based on the position correction value acquired in the same manner as in the first exemplary embodiment (FIG. 13). With this, lens holder 140A can be moved in six degrees of freedom, that is, in the X axis direction, the Y axis direction, the Z axis direction, the rotating direction about the X axis, the rotating direction about the Y axis, and the rotating direction about the Z axis.

[2-2. Effects]

As described above, according to the present exemplary embodiment, four sets of light-emitting unit 131 and optical detector 132 are provided. Therefore, when light-receiving signals of four optical detectors 132 are used in combination, positions in six degrees of freedom can be detected. With this, high-precise position control is enabled.

Third Exemplary Embodiment

[3-1. Configuration]

A third exemplary embodiment will be described below with reference to FIGS. 16 to 19. The configurations similar to the first exemplary embodiment are identified by the same reference numerals, and the description for similar configurations and operations may be omitted in some cases.

Figure 16:
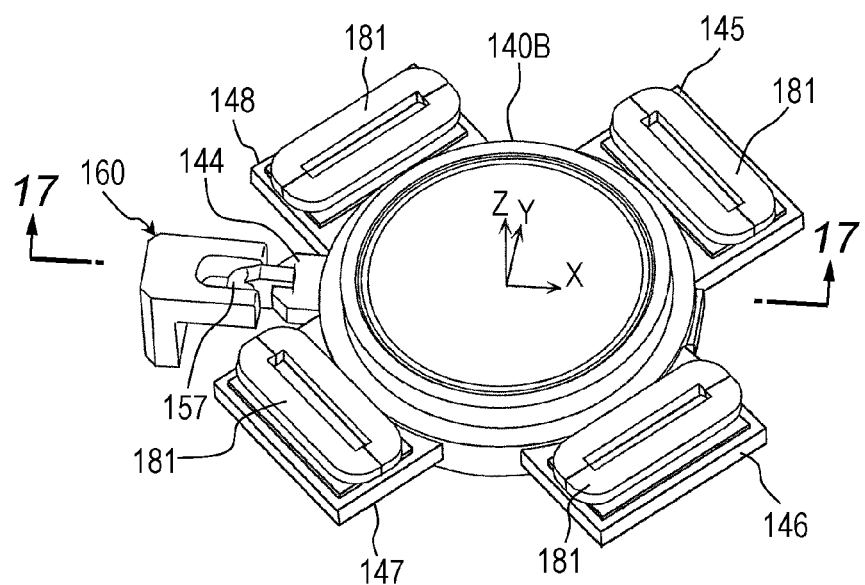
FIG. 16 is a perspective view illustrating an optical system driving device according to a third exemplary embodiment.

FIG. 16 is a perspective view illustrating optical system driving device 100B according to the third exemplary embodiment.

As illustrated in FIG. 16, lens holder 140B in optical system driving device 100B does not include first piece part 141 to third piece part 143, and includes only fourth piece part 144 having shaft 157. The movement of shaft 157 in the Y axis direction is restricted by restriction unit 160. With this, lens holder 140B can be moved in five degrees of freedom, that is, in the X axis direction, Y axis direction, Z axis direction, rotating direction about the X axis, and the rotating direction about the Y axis, as in the first exemplary embodiment.

Figure 17:
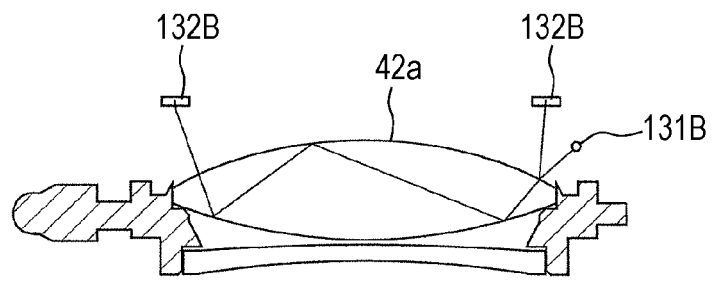
FIG. 17 is a sectional view of a lens holder as viewed from cut line 17-17 in FIG. 16.

FIG. 17 is a sectional view of lens holder 140B as viewed from a cut line 17-17 in FIG. 16. Specifically, cut line 17-17 is a line parallel to the X axis and passing through the centers of lenses 42a, 42b.

As illustrated in FIG. 17, light-emitting unit 131B is provided outward of lens 42a at the positive side in the X axis direction. Light-emitting unit 131B emits light along the X axis direction toward the end of lens 42a at the positive side in the X axis direction. A part of light emitted from light-emitting unit 131B is reflected on the surface at the end of lens 42a at the positive side in the X axis direction. Optical detector 132B is disposed on an optical path of light reflected on the surface of lens 42a.

A part of light emitted from light-emitting unit 131B also enters lens 42a, is totally reflected on a boundary surface of lens 42a several times (three times in the present exemplary embodiment), and then, emitted to the outside of lens 42a from the surface at the end of lens 42a at the negative side in the X axis direction. Optical detector 132B is disposed on an optical path of light emitted from lens 42a.

As described above, light emitted from light-emitting unit 131B passes (is reflected or transmitted) through lens 42a to reach optical detector 132B. In other words, lens 42a functions as a light transmissive unit.

Similarly, one light-emitting unit 131B and a pair of optical detectors 132B are provided in the Y axis direction. Light-emitting unit 131B provided in the Y axis direction is disposed outward of lens 42a at the positive side in the Y axis direction. A pair of optical detectors 132B is disposed on an optical path of light emitted from light-emitting unit 131B. In the Y axis direction either, light emitted from light-emitting unit 131B passes (is reflected or transmitted) through lens 42a to reach optical detector 132B.

Figure 18:
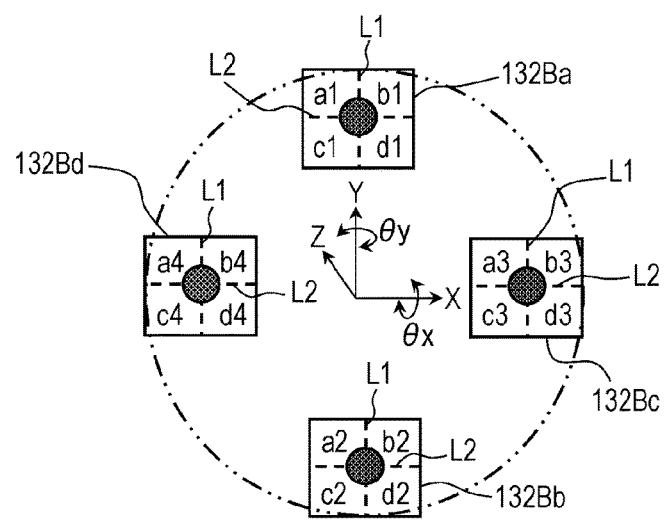
FIG. 18 is a front view schematically illustrating an arrangement example of optical detectors in the optical system driving device according to the third exemplary embodiment.

FIG. 18 is a front view schematically illustrating an arrangement example of optical detectors 132 in optical system driving device 100B according to the third exemplary embodiment.

As illustrated in FIG. 18, optical detector 132B is disposed such that separation boundary L1 extends along the Y axis, and separation boundary L2 extends along the X axis.

In FIG. 18, a1, b1, c1, d1 are each a light-receiving signal of each of separation regions of optical detector (first optical detector 132Ba) disposed at the positive side in the Y axis direction. a2, b2, c2, d2 are each a light-receiving signal of each of separation regions of optical detector (second optical detector 132Bb) disposed at the negative side in the Y axis direction. a3, b3, c3, d3 are each a light-receiving signal of each of separation regions of optical detector (third optical detector 132Bc) disposed at the positive side in the X axis direction. a4, b4, c4, d4 are each a light-receiving signal of each of separation regions of optical detector (fourth optical detector 132Bd) disposed at the negative side in the X axis direction.

Figure 19:
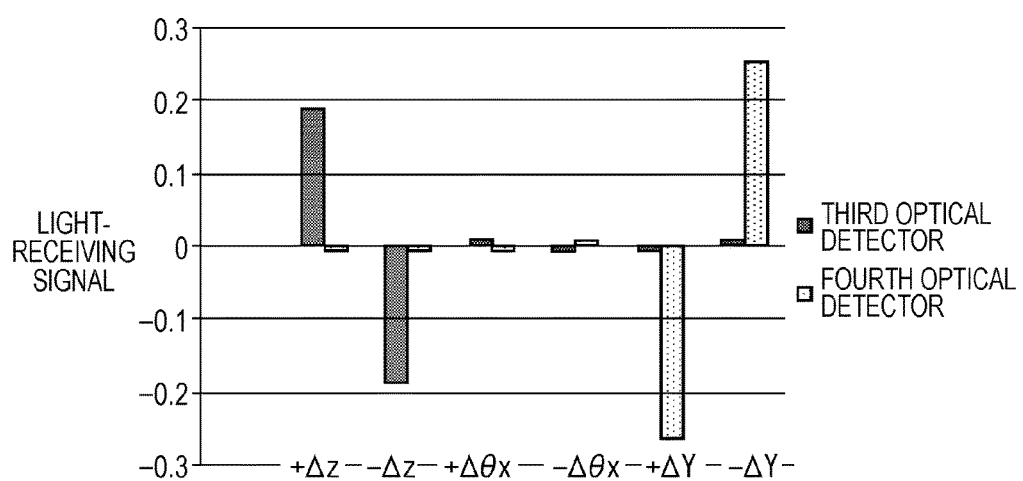
FIG. 19 is a graph illustrating a difference between a light-receiving signal from a third optical detector and a light-receiving signal from a fourth optical detector according to an attitude of the lens holder in the optical system driving device according to the third exemplary embodiment.

FIG. 19 is a graph illustrating a difference between a light-receiving signal from third optical detector 132Bc and a light-receiving signal from fourth optical detector 132Bd based on an attitude of lens holder 140B in optical system driving device 100B according to the third exemplary embodiment.

As illustrated in FIG. 19, when lens holder 140B is displaced toward the positive side in the Z axis direction, the light-receiving signal from third optical detector 132Bc becomes a large positive value, while the light-receiving signal from fourth optical detector 132Bd becomes nearly zero. When lens holder 140B is displaced toward the negative side in the Z axis direction, the light-receiving signal from third optical detector 132Bc becomes a large negative value, while the light-receiving signal from fourth optical detector 132Bd becomes nearly zero.

When lens holder 140B is displaced toward the positive side about the X axis, the light-receiving signal from third optical detector 132Bc becomes a small positive value, while the light-receiving signal from fourth optical detector 132Bd becomes a small negative value. When lens holder 140B is displaced toward the negative side about the X axis, the light-receiving signal from third optical detector 132Bc becomes a small negative value, while the light-receiving signal from fourth optical detector 132Bd becomes a small positive value.

When lens holder 140B is displaced toward the positive side in the Y axis direction, the light-receiving signal from third optical detector 132Bc becomes nearly zero, while the light-receiving signal from fourth optical detector 132Bd becomes a large negative value. When lens holder 140B is displaced toward the negative side in the Y axis direction, the light-receiving signal from third optical detector 132Bc becomes nearly zero, while the light-receiving signal from fourth optical detector 132Bd becomes a large positive value. As described above, light-emitting unit 131 and optical detector 132B are disposed such that sensitivities of light-receiving signals to optical detectors 132B relative to the displacement in the Z axis direction, displacement in the Y axis direction, and the rotation about the X axis differ.

Similarly, a difference between a light-receiving signal from first optical detector 132Ba and a light-receiving signal from second optical detector 132Bb is also obtained. From these, relations represented by equations (26) to (39) described below are established.

In the description below, x is a variable indicating X-coordinate at the centers of lenses 42a, 42b. y is a variable indicating Y-coordinate at the centers of lenses 42a, 42b. z is a variable indicating Z-coordinate at the centers of lenses 42a, 42b. θx is a variable indicating an angle about the X axis at the centers of lenses 42a, 42b. θy is a variable indicating an angle about the Y axis at the centers of lenses 42a, 42b. In addition, α1, α2, α3, β1, β2 are correction coefficients. Suitable values are obtained for correction coefficients from various experiments and simulations.

$$PD11=(a1+b1)-(c1+d1)=\alpha 3\times z \tag{26}$$

$$PD12=(a1+c1)-(b1+d1)=\alpha 1\times x+\beta 1\times \theta x \tag{27}$$

$$PD21=(a2+b2)-(c2+d2)=\alpha 2\times y \tag{28}$$

$$PD22=(a2+c2)-(b2+d2)=\alpha 1\times x+\beta 1\times \theta x \tag{29}$$

$$PD31=(a3+c3)-(b3+d3)=\alpha 3\times z \tag{30}$$

$$PD32=(a3+b3)-(c3+d3)=\alpha 2\times y+\beta 2\times \theta y \tag{31}$$

$$PD41=(a4+c4)-(b4+d4)=\alpha 1\times x \tag{32}$$

$$PD42=(a4+b4)-(c4+d4)=\alpha 2\times y+\beta 2\times \theta y \tag{33}$$

$$PD12=PD22 \tag{34}$$

$$PD32=PD42 \tag{35}$$

$$PD11-PD21=\alpha 3\times z-\alpha 2\times y \tag{36}$$

$$PD12-PD31=\alpha 1\times x-\alpha 3\times z \tag{37}$$

$$PD31-PD41=\alpha 3\times z-\alpha 1\times x \tag{38}$$

The relations represented by equations (39) to (43) can be derived by solving these equations (26) to (38).

$$x=\alpha 1\times PD31 \tag{39}$$

$$y=\alpha 2\times PD21 \tag{40}$$

$$z=\alpha 3\times (PD11+PD31)/2 \tag{41}$$

$$\theta x=(PD12-\alpha 1\times PD31)/\beta 1 \tag{42}$$

$$\theta y=(PD32-\alpha 2\times PD21)/\beta 2 \tag{43}$$

Lens controller 36 performs calculation based on a light-receiving signal output from each of optical detectors 132 and the above relation equations (26) to (44) to detect a position of lens holder 140 in each degree of freedom. Lens controller 36 controls currents of first coils 181 and second coils 182 in all magnet units 170 based on the position correction value acquired in the same manner as in the first exemplary embodiment (FIG. 13). With this, lens holder 140A moves in five degrees of freedom, that is, in the X axis direction, the Y axis direction, the Z axis direction, the rotating direction about the X axis, and the rotating direction about the Y axis.

[3-2. Effects]

As described above, the present exemplary embodiment brings the following effect in addition to the effects of the first and second exemplary embodiments. Specifically, lens 42a held by lens holder 140B serves as a light transmissive unit. Therefore, a position of lens holder 140B movable in each degree of freedom can be detected without separately providing a light transmissive unit exclusively used for position detection. Accordingly, the number of components can be reduced.

In addition, two optical detectors 132B are provided corresponding to one light-emitting unit 131B. Therefore, less number of light-emitting units 131B can be used than the embodiment in which light-emitting unit 131B and optical detector 132B are provided in one-to-one correspondence, whereby the number of components can be reduced.

Fourth Exemplary Embodiment

[4-1. Configuration]

A fourth exemplary embodiment will be described below with reference to FIGS. 20 and 21A to 21G.

Figure 20:
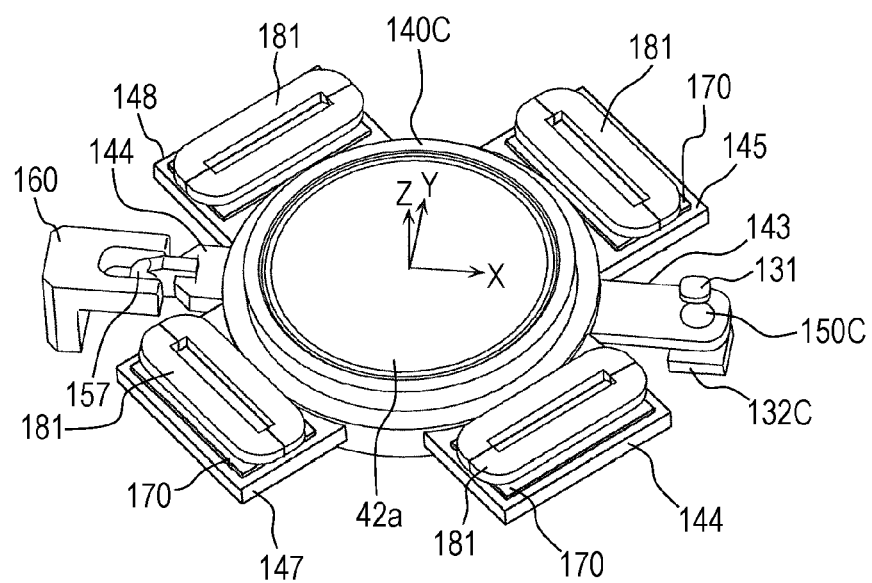
FIG. 20 is a perspective view illustrating an optical system driving device according to a fourth exemplary embodiment.

FIG. 20 is a perspective view illustrating optical system driving device 100C according to the fourth exemplary embodiment. The configurations similar to the first exemplary embodiment are identified by the same reference numerals, and the description for similar configurations and operations may be omitted in some cases. As illustrated in FIG. 20, lens holder 140C in optical system driving device 100C does not include first piece part 141 and second piece part 142, and includes only third piece part 143 and fourth piece part 144 having shaft 157. The movement of shaft 157 in the Y axis direction is restricted by restriction unit 160. With this, lens holder 140C can be moved in five degrees of freedom, that is, in the X axis direction, Y axis direction, Z axis direction, rotating direction about the X axis, and the rotating direction about the Y axis, as in the first exemplary embodiment.

Light transmissive unit 150C with a substantially disc-like shape, such as a condenser lens, is mounted to third piece part 143. Light-emitting unit 131 is disposed so as to emit light toward light transmissive unit 150C at the positive side of light transmissive unit 150C in the Z axis direction. Optical detector 132C is provided at the position facing light-emitting unit 131 across light transmissive unit 150C. Optical detector 132C is an imaging element such as a CCD.

The imaging element images spot P, converts light into voltage on pixel basis, and outputs the voltage as a light-receiving signal. The imaging element has more light-receiving surfaces (pixels) than a quadrant photodetector. Therefore, the imaging element can detect the shape, intensity, and distribution of spot P with higher precision.

When lens holder 140C moves, spot P of light emitted from light-emitting unit 131 and passing through light transmissive unit 150C is changed on the light-receiving surface of optical detector 132C in response to an amount of variation and moving direction of lens holder 140C.

FIG. 21A is an explanatory view illustrating how spot P of light passing through light transmissive unit 150C is changed on the light-receiving surface of optical detector 132C, when lens holder 140C in optical system driving device 100C according to the fourth exemplary embodiment does not move from a reference position. In FIGS. 21A to 21G, a horizontal direction is specified as an X axis direction, and a vertical direction is specified as an Y axis direction. FIG. 21B is an explanatory view illustrating how spot P of light passing through light transmissive unit 150C is changed on the light-receiving surface of optical detector 132C, when lens holder 140C in optical system driving device 100C according to the fourth exemplary embodiment moves toward the positive side in the X axis direction. FIG. 21C is an explanatory view illustrating how spot P of light passing through light transmissive unit 150C is changed on the light-receiving surface of optical detector 132C, when lens holder 140C moves toward the positive side in the Y axis direction. FIG. 21D is an explanatory view illustrating how spot P of light passing through light transmissive unit 150C is changed on the light-receiving surface of optical detector 132C, when lens holder 140C moves toward the positive side in the Z axis direction. FIG. 21E is an explanatory view illustrating how spot P of light passing through light transmissive unit 150C is changed on the light-receiving surface of optical detector 132C, when lens holder 140C moves toward the negative side in the Z axis direction. FIG. 21F is an explanatory view illustrating how spot P of light passing through light transmissive unit 150C is changed on the light-receiving surface of optical detector 132C, when lens holder 140C rotates about the X axis. FIG. 21G is an explanatory view illustrating how spot P of light passing through light transmissive unit 150C is changed on the light-receiving surface of optical detector 132C, when lens holder 140C rotates about the Y axis.

In FIG. 21A, the center of spot P matches the center of optical detector 132C. In FIG. 21B, when lens holder 140C moves in the X axis direction, spot P also moves in the X axis direction in response to the moving amount of lens holder 140C. In FIG. 21C, when lens holder 140C moves in the Y axis direction, spot P also moves in the Y axis direction in response to the moving amount of lens holder 140C. In FIG. 21D, when lens holder 140C moves toward the positive side in the Z axis direction, spot P increases, and the intensity thereof is decreased as a whole in response to the moving amount of lens holder 140C. In FIG. 21E, when lens holder 140C moves toward the negative side in the Z axis direction, spot P decreases, and the intensity thereof is increased as a whole in response to the moving amount of lens holder 140C. In FIG. 21F, when lens holder 140C rotates about the X axis, spot P spreads at the positive side or negative side in the Y axis direction in response to the rotation amount of lens holder 140C. In FIG. 21G, when lens holder 140C rotates about the Y axis, spot P spreads at the positive side or negative side in the X axis direction in response to the rotation amount of lens holder 140C.

With comprehensive analysis of these relations, a position of lens holder 140C in each degree of freedom can be detected from light-receiving signals of many pixels acquired by imaging spot P with optical detector 132C.

[4-2. Effects]

As described above, the present exemplary embodiment brings the following effect in addition to the effects of the first and second exemplary embodiments. Specifically, since optical detector 132C is an imaging element, the shape, intensity, and distribution of spot P can be detected with higher precision. Accordingly, even if only one optical detector 132C is used, a position of lens holder 140C in each degree of freedom can be detected. When only one optical detector 132C is used, it is only necessary to use one light-emitting unit 131, whereby the number of components can further be reduced.

Other Exemplary Embodiments

As presented above, the first to fourth exemplary embodiments have been described as an example of the technology described in the present application. However, the technology in the present disclosure is not limited to these, and can be applied to embodiments in which various changes, replacements, additions, omissions, or the like are made. Moreover, each constituent element described in the first to fourth exemplary embodiments described above can be combined to provide a new embodiment.

Other exemplary embodiments will be described below.

The first to fourth exemplary embodiments describe that optical system driving device 100 moves a lens as an example. However, other optical elements can be moved with optical system driving device 100. Examples of optical elements other than lens include a mirror and a light guide plate.

The first to fourth exemplary embodiments indicate an imaging device such as digital camera 1 as an example of an optical device. However, other optical devices may be used. A projection device such as a projector may be used as other optical devices.

The first to fourth exemplary embodiments indicate aberration correction driving unit 120 including magnet unit 170, first coil 181, and second coil 182 as an example of a driving unit. A unit that can move lens holder 140 (movable body) in each degree of freedom in which lens holder 140 is movable may be used as the driving unit. For example, a multiple degree of freedom actuator using a motor may be used as the driving unit.

The first to fourth exemplary embodiments indicate that lens holder 140 which is a movable body is movable in five degrees of freedom or six degrees of freedom. However, it is only necessary that lens holder 140 is movable in at least three degrees of freedom.

The fourth exemplary embodiment indicates a CCD as an imaging element that is one example of an optical detector. An imaging element imaging spot P, converting light into voltage on pixel basis, and outputting the voltage as a light-receiving signal may be used. Accordingly, the imaging element is not limited to a CCD. However, if a CCD is used as the imaging element, the imaging element is available with low cost. A CMOS image sensor may also be used as the imaging element. Use of a CMOS image sensor as the imaging element is effective to suppress power consumption.

The first to fourth exemplary embodiments indicate lens controller 36 as an example of a calculation unit. The calculation unit may be physically configured in any way, so long as it can detect a position in each degree of freedom from a light-receiving signal from optical detector 132. A programmable microcomputer may be used as the calculation unit. With this, processing content can be changed by changing a program, whereby a degree of freedom of designing the calculation unit can be enhanced. The calculation unit may also be implemented with hard logic. The calculation unit implemented by hard logic is effective to increase processing speed. The calculation unit may include only one element, or may physically include a plurality of elements. When the calculation unit is configured to include a plurality of elements, each control described in claims may be implemented by another element. In this case, it can be considered that the plurality of elements form one calculation unit. In addition, the calculation unit and a member having another function may include one element.

As presented above, the exemplary embodiments have been described as an example of the technology described in the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

The present disclosure is applicable to an optical system driving device for moving a movable body which is movable in at least three degrees of freedom, and an optical device including the optical system driving device. Specifically, the present disclosure is applicable to a digital camera, a movie, a projector, and the like.

What is claimed is:

1. A driving device comprising:
   a single movable body that is movable in at least three degrees of freedom;
   a light transmissive unit that is integrally mounted to the single movable body and moves with the single movable body;
   a driving unit configured to move the single movable body in each of the at least three degrees of freedom; and
   a detection unit that detects a position of the single movable body in each of the at least three degrees of freedom, wherein
   the detection unit includes:
   a light-emitting unit that emits light toward the light transmissive unit; and
   an optical detector that receives light emitted from the light-emitting unit and passing through the light transmissive unit and outputs a light-receiving signal based on the received light, and
   the detection unit detects a position of the single movable body in each of the at least three degrees of freedom based on the light-receiving signal from the optical detector.

2. The driving device according to claim 1, wherein the light transmissive unit is a condenser that condenses light.

3. The driving device according to claim 2, wherein the condenser is a cylindrical lens.

4. The driving device according to claim 1, wherein the detection unit includes three or more sets of the light-emitting unit and the optical detector.

5. The driving device according to claim 1, wherein the optical detector is an imaging element.

6. The driving device according to claim 1, wherein the single movable body is movable in at least five degrees of freedom.

7. The driving device according to claim 1, wherein the detection unit detects a position of the single movable body in each of five degrees of freedom.

8. The driving device according to claim 1, wherein
   the single movable body has a configuration capable of supporting an optical element, and
   the at least three degrees of freedom include a degree in which the single movable body is capable of being displaced along a first axis that is an optical axis; a degree in which the single movable body is capable of being displaced in a plane orthogonal to the first axis and along a second axis that is orthogonal to the first axis; and a degree in which the single movable body is capable of being displaced along a third axis orthogonal to the second axis in the plane.

9. The driving device according to claim 8, wherein the at least three degrees of freedom further include a degree in which the single movable body is capable of being displaced about the second axis, and a degree in which the single movable body is capable of being displaced about the third axis.

10. The driving device according to claim 9, wherein the at least three degrees of freedom further include a degree in which the single movable body is capable of being displaced about the first axis.

11. The driving device according to claim 8, wherein the light transmissive unit is disposed above at least one of the second axis and the third axis.

12. A detecting device for detecting a position of a single movable body that is movable in at least three degrees of freedom comprising:
    a light transmissive unit that is integrally mounted to the single movable body and moves with the single movable body;
    a light-emitting unit that emits light toward the light transmissive unit; and
    an optical detector that receives light emitted from the light-emitting unit and passing through the light transmissive unit and outputs a light-receiving signal based on the received light,
    a controller detecting a position of the single movable body in each of the at least three degrees of freedom based on the light-receiving signal from the optical detector.

13. The detecting device according to claim 12, wherein the light transmissive unit is a condenser that condenses light.

14. The detecting device according to claim 13, wherein the condenser is a cylindrical lens.

15. The detecting device according to claim 12, wherein the detecting device includes three or more sets of the light-emitting unit and the optical detector.

16. The detecting device according to claim 12, wherein the optical detector is an imaging element.

17. The detecting device according to claim 12, wherein the single movable body is movable in at least five degrees of freedom.

18. The detecting device according to claim 12, wherein the controller detects a position of the single movable body in each of five degrees of freedom.

19. A driving device comprising:

a movable body that is movable in at least three degrees of freedom;

a light transmissive unit that is integrally mounted to the movable body and moves with the movable body;

a driving unit configured to move the movable body in each of the at least three degrees of freedom; and a detection unit that detects a position of the movable body in each of the at least three degrees of freedom, wherein the detection unit includes:

a light-emitting unit that emits light toward the light transmissive unit; and an optical detector that receives light emitted from the light-emitting unit and passing through the light transmissive unit and outputs a light-receiving signal based on the received light, the detection unit detects a position of the movable body in each of the at least three degrees of freedom based on the light-receiving signal from the optical detector, and wherein the at least three degrees of freedom include a degree in which the movable body is capable of being displaced along a first axis; a degree in which the movable body is capable of being displaced in a plane orthogonal to the first axis and along a second axis that is orthogonal to the first axis; and a degree in which the movable body is capable of being displaced along a third axis orthogonal to the second axis in the plane.

20. The driving device according to claim 19, wherein the at least three degrees of freedom further include a degree in which the movable body is capable of being displaced about the second axis, and a degree in which the movable body is capable of being displaced about the third axis.

21. The driving device according to claim 20, wherein the at least three degrees of freedom further include a degree in which the movable body is capable of being displaced about the first axis.

* * * * *